United States Patent
Bartmann et al.

[11] 3,829,572
[45] Aug. 13, 1974

[54] ANALGESIC COMPOSITION

[75] Inventors: Wilhelm Bartmann, Neuenhain/Taunus; Hans-Georg Alpermann, Kelkheim/Taunus; Christian Jochum, Offenbach/Main, all of Germany

[73] Assignee: Farbwerke Hoechst Aktiengesellschaft vormals Meister Lucius & Bruning, Frankfurt/Main, Germany

[22] Filed: June 11, 1973

[21] Appl. No.: 368,591

Related U.S. Application Data

[62] Division of Ser. No. 210,621, Dec. 21, 1971, Pat. No. 3,772,297.

[30] Foreign Application Priority Data

Dec. 4, 1971 Germany............................ 2160235

[52] U.S. Cl. ............................................... 424/250
[51] Int. Cl. ............................................ A61k 27/00
[58] Field of Search .................................. 424/250

Primary Examiner—Stanley J. Friedman
Attorney, Agent, or Firm—Curtis, Morris & Safford

[57] ABSTRACT

Analgesic composition containing, as an essential active ingredient, a 1-vinylcarbonyl-piperazine compound of the formula

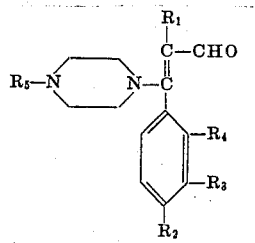

or a salt thereof with physiologically tolerable acid, wherein $R_1$ is hydrogen, alkyl, phenyl, or halo-, alkyl-, or alkoxy-substituted phenyl; $R_2$, $R_3$, and $R_4$ may be the same or different and are hydrogen, alkyl, alkoxy, or halogen; and $R_5$ is alkyl or phenyl.

8 Claims, No Drawings

ANALGESIC COMPOSITION

This is a division of application Ser. No. 210,621 filed Dec. 21, 1971, now U.S. Pat. No. 3,772,297.

The present invention relates to analgesically-active 1-vinylcarbonyl-piperazine compounds and to salts thereof with physiologically-tolerable acids.

It is known to react $\beta$-chlorovinyl-aldehydes with secondary amines to obtain the corresponding $\beta$-aminovinyl-aldehydes [2. Arnold and J. Zemlicka, Collection Czechoslovak Chemical Communications 24, 2385 (1959)]. However, nothing is known of any possible uses of these substances, especially nothing of their pharmacological action.

The present invention provides piperazine derivatives having an analgesic action and corresponding to the formula I

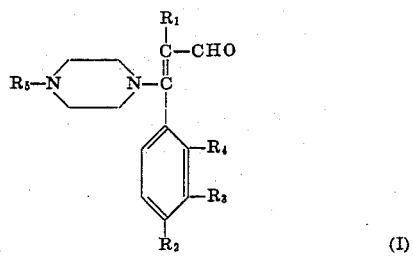

wherein $R_1$ represents a hydrogen atom, an alkyl group having one to four carbon atoms, preferably one to two carbon atoms, a phenyl group which may be substituted by one or two halogen atoms, preferably fluorine, chlorine or bromine, or by one or two alkyl and/or alkoxy groups having each one to four carbon atoms, preferably however one to two carbon atoms, or if one of the substituents $R_2, R_3$ and $R_4$ is not hydrogen and $R_5$ is not methyl, unsubstituted phenyl, $R_2$, $R_3$ and $R_4$ represent, independently of each other, hydrogen, alkyl or alkoxy having each one to four carbon atoms, preferably one to two carbon atoms, or halogen, preferably fluorine, chlorine or bromine, and $R_5$ represents alkyl having one to two carbon atoms, or phenyl, as well as the addition compounds of these piperazines with physiologically tolerated acids.

Furthermore, the present invention provides a process for preparing the compounds of the above-specified formula I, wherein compounds of the formula II

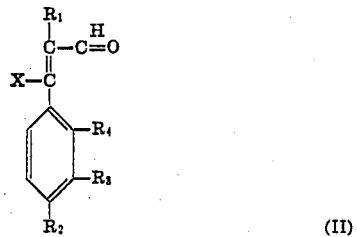

wherein X represents bromine or chlorine, and $R_1$, $R_2$, $R_3$ and $R_4$ have the meanings given above, are reacted in non-aqueous solvents with suitably 1 to 3 molar equivalents of an anhydrous piperazine compound of the formula III

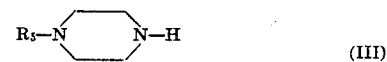

in which $R_5$ has the meaning given above and the compounds obtained are optionally converted with physiologically tolerated acids into the salts thereof.

As non-aqueous solvents, there may be used, for example, ethanol, acetonitrile, dimethylformamide, or dimethyl sulfoxide, preferably aprotic solvents such as anhydrous benzene, toluene or xylene. The reaction is carried out at temperatures between 20°C and 140°C during a period of time of between 2 hours and several days, preferably by heating for 3 to 8 hours to 80° – 120°C. The operation can also be carried out in an inert gas atmosphere, optionally in the presence of a tertiary amine, for example triethylamine, or of an excess of the piperazine derivative. The compounds of the formula I and their salts have crystalline form.

The compounds of the formula I of the invention, which at the same time contain a carbonyl and an enamine function in the molecule, are distinguished by a stability which is surprising for this class of compounds. For example, they are stable to aqueous acetic acid, whereas enamines are in general split in the presence of water even by catalytic amounts of organic acids. The compounds of the formula I in which $R_5$ stands for lower alkyl form crystalline salts with a number of dibasic organic acids such as fumaric acid, oxalic acid or succinic acid. Even with methane-sulfonic acid or with 2N-sulfuric acid, crystallized salts can be obtained with very good yields.

The compounds of the present invention and their physiologically tolerated salts are distinguished by valuable analgesic properties. The compound 1-[1-(4-methoxy-phenyl)-2-(4-methoxy-phenyl)-2-formylvinyl]-4-methylpiperazine-methane-sulfonate (B) was compared with amino-phenazone (comparison compound) in the following tests:

Test No. 1: Heat pain test on the mouse ("Brennstrahl - methode" or "radiant heat method" by L.Ther,E. Lindner,G.Vogel described in "Zur pharmakodynamischenWirkung der optischen Isomeren des Metadons" in D. Apoth.Ztg. 103, 514–520 (1963), according to which a light beam is directed on the upper proximal part of a mouse's tail and the time until reaction occurs is measured).

Test No. 2: Hot plate test on a mouse (copper plate 56° C) according to G. Woolfe and A.D. McDonald, J. Pharmacolog. Exp. Ther. 80, 300 (1944).

In the following table, $ED_{50}$ indicates the graphically determined average single dose in milligrams (per kilogram of body weight) of 60 animals each, where 50 percent of the animals show a time of reaction to the pains longer by at least 100 percent than the reaction time measured before the treatment of the animals.

| Active substance | Test No. 1 (Light beam) | | Test No. 2 (Hot plate) |
|---|---|---|---|
| | Peroral $ED_{50}$ | Subcutaneous $ED_{50}$ | Subcutaneous $ED_{50}$ |
| B | 82 mg/kg | 76 mg/kg | 74 mg/kg |
| Comparison | 400 mg/kg | 110 mg/kg | 177 mg/kg |

The indicated values show that with regard to analgesic properties the compound of the present invention is clearly superior to the substance used for the comparison.

The compounds of the invention may be used in pharmaceutical preparations having an analgesic action, in admixture with pharmaceutically conventional carriers, solvents and excipients.

For oral administration, powders, tablets, dragees or capsules are used which contain the analgesic agent in an amount between 0.05 and 0.5 g, preferably between 0.1 and 0.3 g, per single dose, in admixture with carriers such as lactose, starch, talc and similar carriers.

For parenteral administration, the compounds of the invention are suitably used in isotonic solutions.

The compounds of the invention with analgesic action may furthermore be used in combination with other drugs. As such, there may be used, in addition to other analgesic agents, for example antipyretic agents such as acetyl-salicylic acid, N-acetyl-p-aminophenol, phenacetin, pyrazolone derivatives, ethoxybenzamide or purine derivatives such as coffeine.

The following Examples illustrate the invention:

EXAMPLE 1

*a.* 1-[1,2-Di-(4-methoxyphenyl)-2-formylvinyl]-methylpiperazine 12 g (39.6 mmoles) of 3-chloro-2,3-di-(4-methoxyphenyl)-acrylaldehyde (preparation see below) were dissolved in 250 ml of anhydrous toluene and heated to the boiling temperature for 4 hours under reflux with 8 g (80 mmoles) of 1-methylpiperazine. The reaction product was cooled to room temperature, washed with 2N-NaOH and then extracted with 2N-HCl, while simultaneously allowing the acid aqueous extracts to run into an excess of 2N–NaOH. The aqueous alkaline solution was extracted with benzene. The benzene solution was washed with water, dried over sodium sulfate and the solvent was removed by distillation under strongly reduced pressure. 14.6 g of a light brown solid substance remained behind which, after recrystallization from cyclohexane, yielded 9.9 g (67 percent of the theory) of thin-layer chromatographically uniform crystals that had a melting point of 160° – 161°C.

*b.* For preparing the methane-sulfonate, 9.9 g of the above-specified piperazine derivative in isopropanol were combined with 2.6 g of methane-sulfonic acid. After filtration and recrystallization from ethanol, 10.1 g of 1-[1,2-di-(4-methoxyphenyl)-2-formylvinyl]-4-methylpiperazine-methane-sulfonate having a decomposition point of 230° – 232°C were obtained.

2,3-Di-(4-methoxyphenyl)-3-chloro-acryl-aldehyde was prepared according to M.Weissenfels and coworkers, Tetrahedron Letters 1968, page 3045, from desoxy-anisoin,dimethylformamide and phosphorus oxychloride in trichloroethylene; melting point 155° – 157°C (from ethanol). The starting materials for Examples 5 and 6 were likewise prepared according to this method.

EXAMPLE 2

1-[1,2-Di-(4-methoxyphenyl)-2-formylvinyl]-4-phenyl-piperazine 3 g of 3-chloro-2,3-di-(4-methoxyphenyl)-acrylaldehyde were heated to the boiling temperature for 8 hours with 4 g of 1-phenyl-piperazine in 50 ml of toluene, under reflux and with exclusion of moisture. After allowing the whole to stand for 12 hours, it was filtered, the filtrate was washed with 2N—NaOH and then with water, dried over sodium sulfate and the solvent was removed by distillation under strongly reduced pressure. 5.6 g of an oil were obtained which, after trituration with diethyl ether, crystallized to yield 1.97 g (46 percent of the theory) of yellow crystals which, after recrystallization from ethanol, were found to melt at 166° – 168° C.

EXAMPLE 3

*a.* 1-[1-(4-methylphenyl)-2-phenyl-2-formylvinyl]-4-methyl-piperazine 9.48 g of 2-phenyl-3-(4-methylphenyl)-3-chloro-acryl-aldehyde were heated under reflux, for 4 hours, to the boiling temperature and under exclusion of moisture, with 7.45 g of 1-methyl-piperazine. After cooling to room temperature, the whole was filtered with suction. The filtrate was shaken with 2N—NaOH, washed with water almost to neutrality, dried over sodium sulfate and the solvent was removed by distillation under reduced pressure. After triturating the oily residue with diethyl ether, 7.14 g (60.5 percent of the theory) of thin-layer chromatographically uniform crystals melting at 138° – 139° C were obtained.

*b.* For preparing a salt, 7.14 g of the afore-mentioned piperazine derivative in isopropanol were combined with 1.75 g of oxalic acid. After isolation by filtration and recrystallization of the salt from methanol, 5 g of hydrogeno-oxalate were obtained; melting point 182° – 183° C with decomposition.

The 2-phenyl-3-(4-methylphenyl)-3-chloro-acryl-aldehyde used as starting material was prepared according to the method described in Example 3 from 4-methyl-desoxy-benzoin. Melting point 118° – 119° C (from ethanol).

EXAMPLE 4

*a.* 1-[1-(4-chlorophenyl)-2-phenyl-2-formylvinyl]-4-methyl-piperazine 16.5 g of 2-phenyl-3-(4-chlorophenyl)-3-chloro-acryl-aldehyde were heated for 4.5 hours to the boiling temperature, under reflux, with 18.4 g of 1-methyl-piperazine in 250 ml of anhydrous toluene. After having worked up as described in Example 1, 16.17 g of an oily crude product were obtained which, after treatment with diethyl ether, yielded 10.04 g (50 percent of the theory) of crystalline 1-[1-(4-chlorophenyl)-2-phenyl-2-formylvinyl]-4-methyl-piperazine. After recrystallization from diethyl ether, a thin-layer chromatographically uniform product having a decomposition point of 185° – 187° C was obtained.

*b.* The methane-sulfonate prepared in a manner analogous to that described in Example 3*b*) had, after recrystallization from ethanol, a decomposition point of 237° C.

The 2-phenyl-3-(4-chlorophenyl)-3-chloro-acryl-aldehyde used as starting material can be obtained according to a process des by K. Bodendorf and R. Mayer, Chem. Ber. 98, 3557 (1965); after recrystallization from isopropanol, the compound was found to melt at 110° – 112° C.

In analogous manner, there were prepared:

EXAMPLE 5

From 2-phenyl-3-(4-methoxyphenyl)-3-chloro-acrylaldehyde (melting point 113° C), 67 percent of the theory of 1-[1-(4-methoxyphenyl)-2-phenyl-2-formylvinyl]-4-methylpiperazine having a melting point of 197° C (from methanol). The corresponding methanesulfonate was found to decompose at 252° – 253° C (from di-isopropyl ether/methanol).

EXAMPLE 6

From 2-phenyl-3-(4-methoxyphenyl)-3-chloro-acrylaldehyde (melting point 113° C), 62 percent of the theory of 1-[1-(4-methoxyphenyl)-2-phenyl-2-formylvinyl]-4-phenyl-piperazine having a melting point of 200° – 202° C (from ethanol).

EXAMPLE 7

From 2-(4-methoxyphenyl)-3-phenyl-3-chloro-acrylaldehyde (melting point 128° – 129° C), 70 percent of the theory of 1-[1-phenyl-2-(4-methoxyphenyl)-2-formylvinyl]-4-methyl-piperazine having a melting point of 140° – 141° C (from diethyl ether). The corresponding hydrogeno-oxalate was found to decompose at 186° – 187° C (from ethanol).

EXAMPLE 8

From 2-phenyl-3-(2-methoxyphenyl)-3-chloro-acrylaldehyde melting point 98° C), 58 percent of the theory of 1-[-(2-methoxyphenyl)-2-phenyl-2-formylvinyl]-4-methyl-piperazine having a melting point of 139° – 141° C (from diethyl ether). The corresponding hydrogeno-oxalate was found to melt at 211° – 212° C (from methanol).

EXAMPLE 9

From 2-(2-chlorophenyl)-3-phenyl-3-chloro-acrylaldehyde, 56 percent of the theory of 1-[1-phenyl-2-(2-chlorophenyl)-2-formylvinyl]-4-methylpiperazine having a melting point of 147° – 149° C (from diethyl ether). The corresponding methane-sulfonate was found to melt at 202° C (from isopropanol).

EXAMPLE 10

1-[1-(2,4-dimethoxyphenyl)-2-formylvinyl]-4-methyl-piperazine 22.65 g of 1-formyl-2-chloro-2-(2,4-dimethoxyphenyl)-ethylene (melting point 60° – 62° C) were dissolved in 100 ml of benzene and added dropwise to a solution of 30 g of 1-methylpiperazine in 100 ml of benzene. After heating for 4 hours under reflux, the whole was cooled, washed twice with 50 ml portions of 2N—NaOH and subsequently with water to neutrality. After drying over sodium sulfate, the solvent was removed by distillation under reduced pressure and the residue was recrystallized from a mixture of ethyl acetate and petroleum ether having a ratio of 1:1. 20 g (70 percent of the theory) of 1-[1-(2,4-dimethoxyphenyl)-2-formylvinyl]-4-methylpiperazine having a melting point of 131° C were obtained. The hydrogeno-fumarate prepared in the usual manner was found to melt at 113° – 115° C.

The starting materials of Examples 12 and 14 were prepared according to M. Weissenfels, H. Schurig and G. Huhsam, Zeitschrift fur Chemie 6, 471, Leipzig 1966.

The following compounds were obtained in analogous manner:

EXAMPLE 11

From 1-formyl-2-chloro-2-phenylethylene, 64 percent of the theory of 1-(2-formyl-1-phenylvinyl)-4-methyl-piperazine having a melting point of 96° C. The methane-sulfonate was found to melt at 214° C.

The starting material used in Examples 13 and 15 was prepared according to W. Ziegenbein and W. Franke, Angewandte Chemie 71, 573 (1959).

EXAMPLE 12

From 1-formyl-2-chloro-2-(4-bromophenyl)-ethylene, 67 percent of the theory of 1-[1-(4-bromophenyl)-2-formylvinyl]-4-methyl-piperazine having a melting point of 120° C. The hydrogeno-fumarate was found to melt at 208° C.

EXAMPLE 13

From 1-formyl-2-chloro-2-(4-methylphenyl)-ethylene, 68 percent of the theory of 1-[2-formyl-1-(4-methylphenylvinyl)]-4-methylpiperazine, the hydrogeno-fumarate of which was found to melt at 215° C.

EXAMPLE 14

From 2-phenyl-3-(3,4-dimethoxyphenyl)-3-chloroacryl-aldehyde (melting point 137° – 139° C), 77 percent of the theory of 1-[1-(3,4-dimethoxyphenyl)-2-phenyl-2-formyl-vinyl]-4-methyl-piperazine having a melting point of 156° – 158° C (from ethyl acetate).

EXAMPLE 15

From 2-phenyl-3-(3-methylphenyl)-3-chloro-acrylaldehyde (melting point 80.5° – 81.5° C), 64 percent of the theory of 1-[1-(3-methyl-phenyl(-2-phenyl-2-formylvinyl]-4-methyl-piperazine having a melting point of 135°C (from cyclohexane).

The hydrogeno-oxalate of this compound was found to decompose at 123° – 125°C (from ethyl-methyl ketone).

EXAMPLE 16

From 2-phenyl-3-(4-fluorophenyl)-3-chloro-acrylaldehyde (melting point 152° – 153°C), 66 percent of the theory of 1-[1-(4-fluorophenyl)-2-phenyl-2-formylvinyl]-4-methyl-piperazine having a melting point of 154° – 155°C (from cyclohexane).

The hydrogeno-oxalate of this compound was found to decompose, after recrystallization from methanol, from 96°C onwards.

The starting materials of Examples 7 to 9 and 14 were prepared according to the method described by Weissenfels et al., Zeitschrift fur Chemie 6, 471, Leipzig 1966.

We claim:

1. Pharmaceutical composition having analgesic activity containing 0.05 to 0.5 grams/dose, as an essential active ingredient thereof, a vinylcarbonyl-piperazine compound of the formula

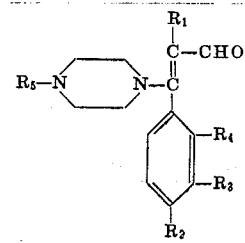

or a salt thereof with a physiologically tolerable acid wherein one of groups $R_2$, $R_3$, and $R_4$ is hydrogen, halogen, or alkyl or alkoxy having one to four carbon atoms and the remaining two groups are hydrogen; $R_5$ is methyl, ethyl, or phenyl; and $R_1$ is hydrogen, alkyl having one to four carbon atoms, phenyl which is mono- or di-substituted by halogen or by alkyl or alkoxy having one to four carbon atoms, and, if one of $R_2$, $R_3$, and $R_4$ is other than hydrogen or $R_5$ is other than methyl, then $R_1$ additionally is unsubstituted phenyl.

2. Pharmaceutical composition as defined in claim 1 wherein the active compound is 1-[1,2-di-(4-methoxyphenyl)-2-formylvinyl]-4-methyl piperazine or a salt thereof with a physiologically tolerable acid.

3. Pharmaceutical composition as defined in claim 1 wherein the active compound is 1-[1-(4-methoxyphenyl)-2-phenyl-2-formylvinyl]-4-methyl piperazine or a salt thereof with a physiologically tolerable acid.

4. Pharmaceutical composition as defined in claim 1 wherein the active compound is 1-[1-phenyl-2-(4-methoxyphenyl)-2-formylvinyl]-4-methyl piperazine or a salt thereof with a physiologically tolerable acid.

5. Pharmaceutical composition as defined in claim 1 wherein the active compound is 1-[1-phenyl-2-(2-chlorophenyl)-2-formylvinyl]-4-methyl piperazine or a salt thereof with a physiologically tolerable acid.

6. Pharmaceutical composition as defined in claim 1 wherein the active compound is 1-[1-(2,4-dimethoxyphenyl)-2-formylvinyl]-4-methyl piperazine of a salt thereof with a physiologically tolerable acid.

7. Pharmaceutical composition as defined in claim 1 wherein the active compound is 1-(2-formyl-1-phenylvinyl)-4-methyl piperazine or a salt thereof with a physiologically tolerable acid.

8. Pharmaceutical composition as defined in claim 1 wherein the active compound is 1-[1-(3-methylphenyl)-2-phenyl-2-formylvinyl]-4-methyl piperazine or a salt thereof with a physiologically tolerable acid.

* * * * *